W. E. AND C. E. WINTEMUTE.
WIRE ROPE SHEARS.
APPLICATION FILED JAN. 11, 1921.
1,413,447.
Patented Apr. 18, 1922.
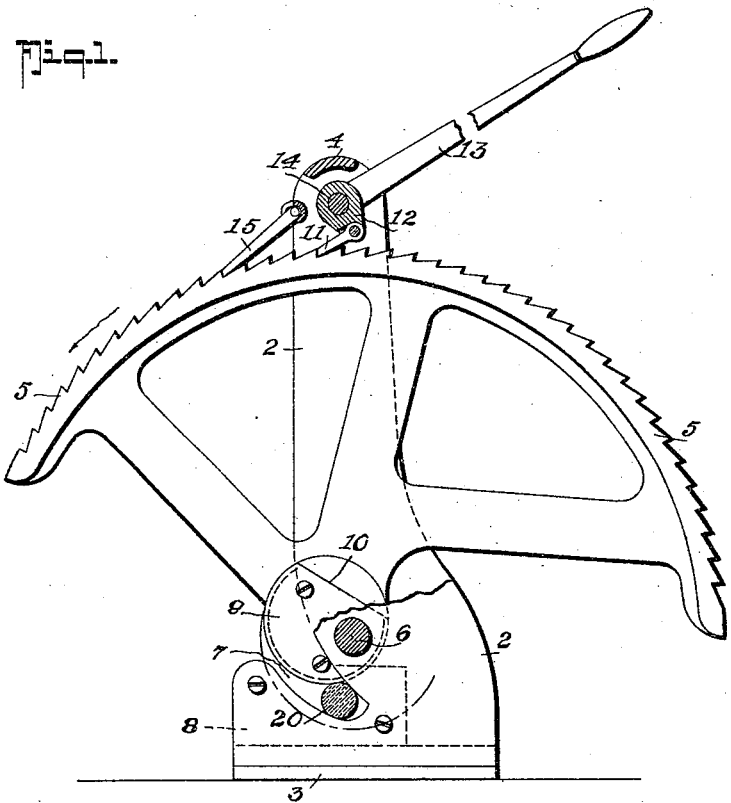
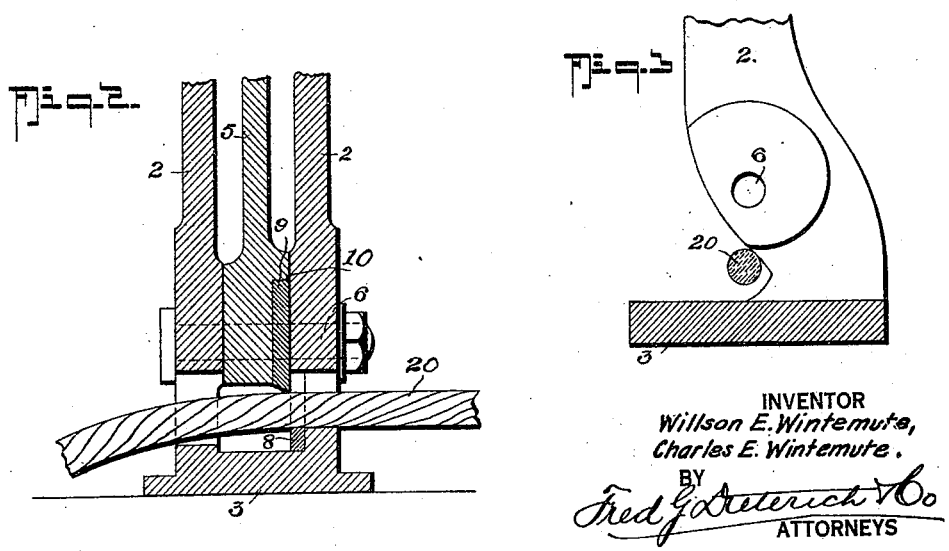
INVENTOR
Willson E. Wintemute,
Charles E. Wintemute.
BY
Fred G. Dieterich & Co.
ATTORNEYS

UNITED STATES PATENT OFFICE.

WILLSON EGERTAN WINTEMUTE AND CHARLES ERNEST WINTEMUTE, OF VANCOUVER, BRITISH COLUMBIA, CANADA.

WIRE-ROPE SHEARS.

1,413,447.  Specification of Letters Patent.  Patented Apr. 18, 1922.

Application filed January 11, 1921. Serial No. 436,550.

*To all whom it may concern:*

Be it known that we, WILLSON E. WINTEMUTE and CHARLES E. WINTEMUTE, citizens of the Dominion of Canada, residing at Vancouver, in the Province of British Columbia, Canada, have invented certain new and useful Improvements in Wire-Rope Shears, of which the following is a specification.

This invention relates to a manually operated shearing machine for wire rope which has been particularly designed to be simple and relatively inexpensive in its first cost and effective in its operation.

The cutting of wire rope presents difficulties in compactly holding together the individual wires of the rope while the cutting is being effected.

In the device, which is the subject of this application, the rope is effectively supported in a wedge-shaped notch which forms a stationary shearing blade and the other shearing blade is mounted to be movable about a centre which is eccentric with the shearing edge of the blade.

The rope is thus by the shearing pressure of the movable blade forcibly pressed into the taper of the notch and the wires of the rope are held compactly together during the shearing action. The eccentric action of the movable blade is alone a powerful and effective one, and it is mounted around the centre of a wheel segment to the periphery of which a powerful lever action is applied to rotate the segment, and with it the shearing blade. Thus, while the manual effort at the handle end of the lever may be relatively light, the shearing action at the blade is a powerful one that readily cuts through the compacted wires of the rope.

The invention is particularly described in the following specification, reference being made to the drawings by which it is accompanied, in which:

Fig. 1 is a sectional elevation in part section of the device.

Fig. 2, a vertical section to an enlarged scale in a plane across that of the shearing movement, and Fig. 3 is a view of the further standard showing where it is cleared away to enable the rope to be passed into the notch of the other standard.

The frame of the device comprises two standards 2 projecting upward from a base plate 3 and the upper ends of the standards are connected together at 4. Adjacent the base of the standards a wheel sector 5 is rotatably mounted between them on a pin 6, which passes through both side standards and is faced to fit snugly between the corresponding faces of the standards.

Adjacent the pivot pin 6 a tapered notch 7 is formed in one standard of the frame and the other standard is cleared to afford access of a rope 20 to the notch. This notch extends angularly downward in a slight curve to its smaller dimension immediately beneath the pin 6. On the inner face of the notched standard adjacent the notch 7 and conforming with the entire underside of the notch and with a portion of the upper side adjacent the smaller end, is secured the fixed shear blade 8.

The hub of the wheel sector 5 is eccentric with the pin 6 on which it is mounted, and on the face of this hub adjacent the fixed shear blade 8 is secured the movable shear blade 9. This movable blade 9 is circular and corresponds with the eccentric hub of the wheel sector. It has a segment removed as at 10 to fit against a corresponding shoulder on the face of the hub, and apertured for the pin 6 to pass through it.

As the wheel sector 5 is partially rotated on its pin 6 the edge of the shear blade 9 being eccentric with that pin is powerfully moved toward the fixed blade 8 crushing the wire rope tightly into the smaller dimension of the notch 7 and shearing its compacted wire.

The wheel sector may be rotated by any suitable means. It is here shown as rotated by means of a pawl 11 pivotally connected to and strongly mounted in one end 12 of a handle lever 13 mounted on a pin 14 secured between the upper ends of the standards 2, which pawl engages ratchet teeth formed in the periphery of the wheel sector. The pawl lever is arranged to effect the cutting movement during downward movement of the lever, so that there is little tendency to disturb the stability of the device on its base 3.

Pivotally mounted between the upper ends of the standards 2 adjacent the pawl lever pin 14 is a check pawl 15 designed to hold the segments against backward rotation, while the lever 12 is being lifted for another stroke.

This forms a simple and effective means of rotating the wheel sector but any simple or compound gearing may be used for this purpose without departing from the spirit of the invention, the substance of which is the use of an eccentric movable shear blade adapted to move against a fixed shear blade.

The shears is particularly efficient in its operation and the applied pressure to operate them being relatively light and downwardly applied does not materially disturb the stability of the device, so that it requires no fastening to the floor. It is therefore readily portable to where it is required to be used.

Having now particularly described our invention, we hereby declare that what we claim as new and desire to be protected in by Letters Patent, is:

1. A wire rope shearing device, comprising the combination with a suitable frame, of a shear blade rotatably mounted therein, the shearing edge of which blade is eccentric to the axis of its movement, a fixed shearing blade secured to the frame, the shearing edge of which fixed blade is substantially concentric with the axis of the movable blade, means for rotating the movable blade and provision in the frame to which the fixed blade is secured for arresting movement of the rope to be cut along the edge of the fixed blade and for crushing the rope against the shearing blade whereby its wires are compacted before being sheared.

2. A wire rope shearing device, comprising the combination with a suitable frame having standards upwardly projecting from its base, said standards apertured for a pin for a movable shear blade, one of said standards having a tapered notch the outer edge of which is substantially concentric with the pin aperture of the movable blade, the other standard being cut away to afford access of the rope to the notch, a shearing blade fixed to the inner face of the notched standard and conforming with the outer edge of the notch, an eccentric shear blade rotatably mounted in the pin apertures of the standards, and means for rotating the shear blade.

3. A wire rope shearing device, comprising the combination with a frame having a base and two standards upwardly projecting from it, one of said standards having a tapered notch adapted to receive the various sizes of rope and the other standard being cut away to afford access of the rope to the notch, a shear blade secured to the notched standard and conforming generally to the shape of the notch, a sector rotatably mounted between the standards of the frame on a pin immediately over the smaller dimension of the notch, an eccentric shear blade secured to the hub of the sector and adapted to move in shearing relation to the blade on the standard, and means for rotating the sector.

4. A wire rope shearing device, comprising the combination with a frame having a base and two standards upwardly projecting from it, one of said standards having a tapered notch inclined downward and inward from one side edge and adapted to receive the various sizes of rope, the other standard being cut away to afford access of the rope to the notch, a shear blade secured to the inner side of the notched standard and conforming to the underside of the notch and around its smaller end, a sector rotatably mounted between the standards on a pin immediately over the smaller dimension of the notch, an eccentric shear blade secured on the hub of the sector and adapted to move in shearing relation to the blade fixed on the standard, a handled lever pivotally mounted between the upper ends of the standards, a ratchet pawl pivotally mounted in one end of the lever which pawl is designed to engage ratchet teeth formed in the rim of the sector, and a check pawl pivotally mounted between the ends of the standards and engaging the ratchet teeth of the sector.

In testimony whereof we affix our signatures.

WILLSON EGERTAN WINTEMUTE.
CHARLES ERNEST WINTEMUTE.